M. P. McELHINNEY.
COMBINED BLOTTER AND RULER.
No. 192,926. Patented July 10, 1877.
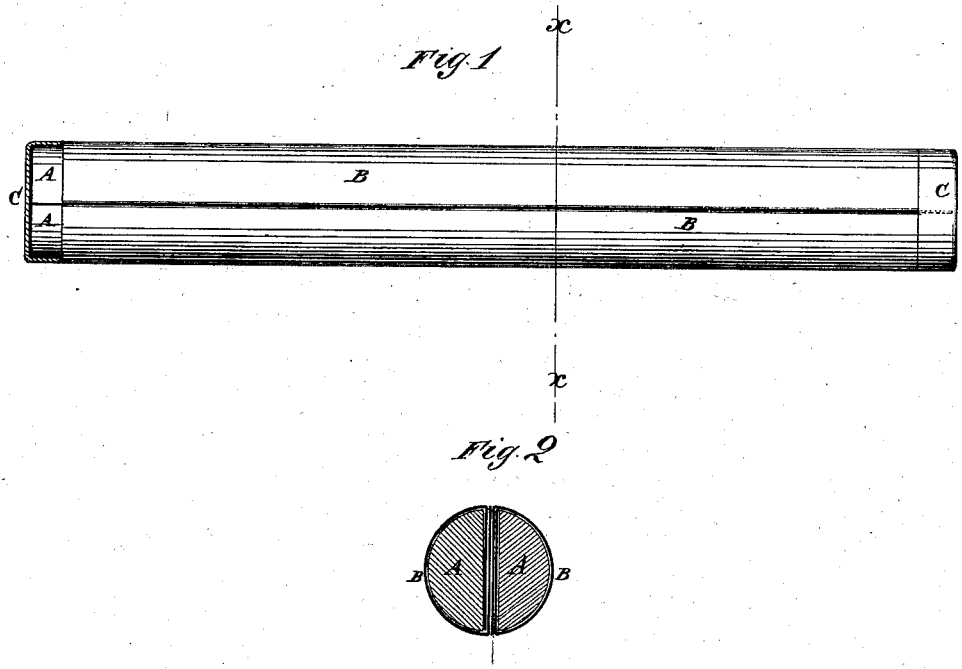
WITNESSES:
INVENTOR:
BY
ATTORNEYS.

UNITED STATES PATENT OFFICE.

MARK P. McELHINNEY, OF MONTREAL, QUEBEC, CANADA, ASSIGNOR TO ROBERT W. SIMPSON, OF SAME PLACE.

IMPROVEMENT IN COMBINED BLOTTER AND RULER.

Specification forming part of Letters Patent No. 192,926, dated July 10, 1877; application filed June 11, 1877.

*To all whom it may concern:*

Be it known that I, MARK P. MCELHINNEY, of Montreal, in the province of Quebec and Dominion of Canada, have invented a new and useful Improvement in Blotting-Ruler, of which the following is a specification:

Figure 1 is a side view of my improved blotting-ruler, one of the caps being shown in section. Fig. 2 is a cross-section of the same, taken through the line $x$ $x$, Fig. 1.

Similar letters of reference indicate corresponding parts.

The object of this invention is to furnish an improved ruler which shall be so constructed as to adapt it to be used also as a blotter, and which shall be simple in construction and inexpensive in manufacture.

The invention consists in an improved blotting-ruler formed of the two semi-cylindrical strips A, the blotting-paper B, wrapped around them, and the ferrules or caps C, as hereinafter fully described.

The body of the ruler is formed of two semi-cylindrical strips, A, of light well-seasoned wood or other suitable material, of any suitable length and size. Each of the strips A is covered with one, two, three, or more thicknesses of blotting-paper B, wrapped snugly around it. The flat surfaces of the two parts are then brought together, and rings, ferrules, or caps C, of iron or other suitable material, are slipped upon their ends, the slight elasticity of the blotting-paper being sufficient to keep said caps C securely in place.

When used for ruling, the blotting-paper keeps the ruler from slipping, so that there will be less liability to make crooked lines than with an ordinary ruler.

The device is used as a blotter by rolling it over the manuscript, and when the blotting-paper becomes unfit for further use, it can be readily detached and replaced with fresh paper.

Having thus described my invention, I claim as new and desire to secure by Letters Patent—

An improved blotting-ruler, formed of the two semi-cylindrical strips A, the blotting-paper B, wrapped around them, and the ferrules or caps C, substantially as herein shown and described.

MARK PATTEN McELHINNEY.

Witnesses:
WM. HILL,
FRED. G. WILLS.